June 5, 1928.

R. H. MORRIS 1,672,075

COMBINATION CONDUIT AND PULLEY SUPPORT

Filed March 22, 1926

INVENTOR.
Roy H. Morris
BY Townsend, Loftus & Hattett
ATTORNEYS.

Patented June 5, 1928.

1,672,075

UNITED STATES PATENT OFFICE.

ROY H. MORRIS, OF PIEDMONT, CALIFORNIA.

COMBINATION CONDUIT AND PULLEY SUPPORT.

Application filed March 22, 1926. Serial No. 96,670.

This invention relates to a combination conduit and pulley support for chains, cables and the like, such as used in mechanical remote controls. In the operation of mechanical remote controls such, for instance, as a signalling mechanism in the engine room of a ship which is controlled from the bridge, it is common practice to connect the control and the mechanism actuated thereby by chains, wire cables or the like. The actual distance between the bridge and the engine room is considerable, particularly in large ships and as the connecting chain or cable passes through a number of decks, bulkheads, compartments, etc., where beams, machinery and other obstructions must be circumvented, it is obvious that the length of the cable is considerably increased and that numerous turns, right-angular and otherwise must be made, and that numerous pulleys and conduits must be provided to guide the cable as direction changes and to prevent jumping of the pulleys. Separate pulleys, supporting brackets and conduits are usually employed and each must be individually supported.

The installation as a whole, while seemingly fairly simple, presents quite a problem as a convenient support for the individual pulley brackets and conduits is not always obtainable.

The object of the present invention is to generally improve and simplify the construction and operation of installations of this character, to provide a combination pulley support and conduit for the connecting chain or cable which may be readily installed, and further to provide a combination pulley support and conduit in which the pulley support and conduit are connected and supported with relation to each other and turnably adjustable about the longitudinal axis of the conduit and also angularly adjustable about the pulley axis.

One form which the invention may assume is exemplified in the accompanying drawings in which—

Figure 1:
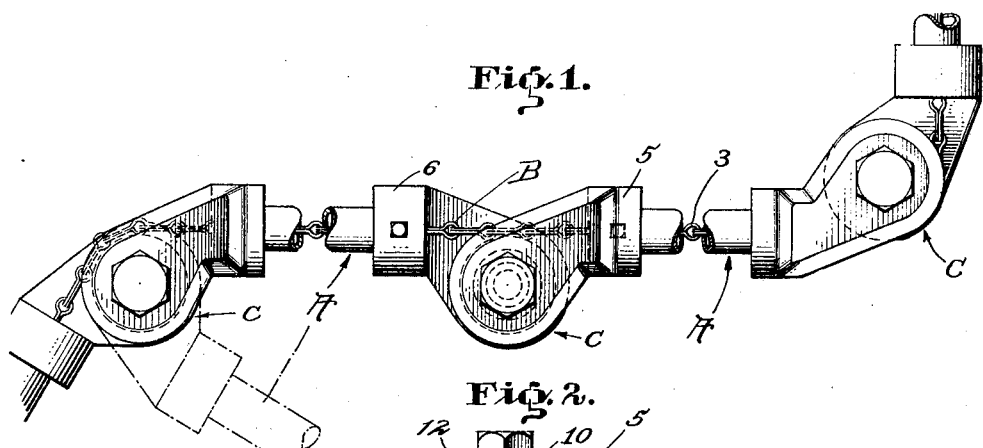
Fig. 1 is a plan view of the combination pulley support and conduit.
Figure 2:
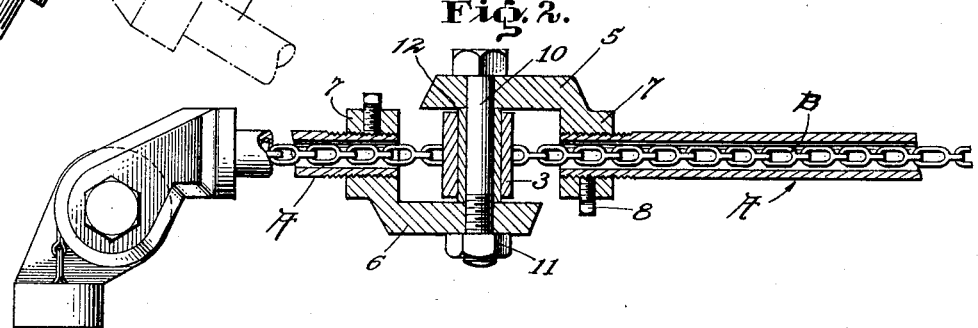
Fig. 2 is a similar view partially in section.
Figure 3:
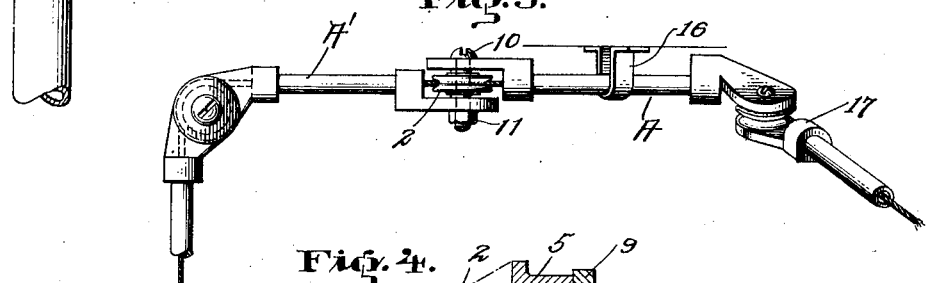
Fig. 3 is a perspective view of the combination pulley and support and conduit.
Figure 4:
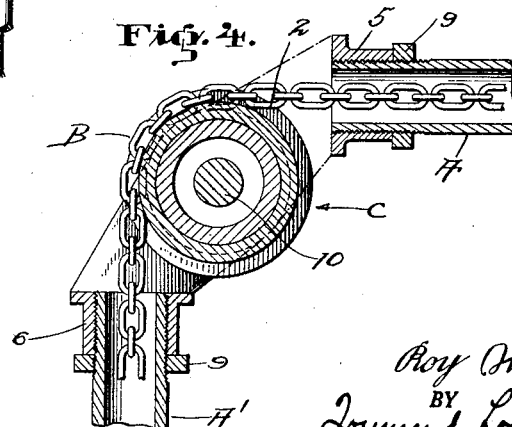
Fig. 4 is an enlarged section of the pulley support showing the ends of two conduits connected therewith.

Referring to the drawings in detail and particularly Figs. 1, 2 and 4, A indicates in general a conduit whereby a chain such as indicated at B or the like may be guided, and C indicates a series of pulleys whereby the direction of the cable may be changed. The pulleys may be in the form of a V-shaped pulley such as shown at 2, in Figs. 3 and 4, or it may be in the form of an ordinary sleeve or bushing such as indicated at 3 in Fig. 2.

The pulley brackets consist of two identical sections such as shown at 5 and 6. Each section consists of a side plate, see Figs. 1 and 2, and a hub member 7 which is internally threaded to receive the conduit A. The threaded connection permits turning or adjustment of the brackets about the longitudinal axis of the conduit and they also permit longitudinal adjustment upon the conduit, the brackets being secured when turned or longitudinally adjusted by means of set screws 8 or by means of lock nuts or the like as shown at 9, see Fig. 4. The brackets serve several functions, first that of supporting the pulley and secondly that of connecting a pair of conduits. They also serve the function of supporting the conduit and furthermore permit angular adjustment of the conduits with relation to each other so as to change the direction of the chain or cable and circumferential adjustment as will hereinafter be described.

The pulley brackets, as before described, are identical in construction as shown in Figs. 1 and 2 and they are connected by means of a bolt 10 and nuts 11. The space between the brackets is determined by a surrounding bushing 12 and this bushing serves as a bearing member either for a pulley such as shown at 2 or a sleeve or exterior bushing such as shown at 3. The cable or chain B extends through the conduit, passes over the sleeve or bushing 3 and is guided thereby into the adjoining conduit A', see Fig. 2, and it is for this reason that the chain or cable may be directed to circumvent any object. The bolt 10 and the nut 11 serve three functions, first, that of securing the pulley brackets with relation to each other, secondly, that of a journal or bearing member for the bushings 12 and 3 and third, that of a clamping member to secure the pulley brackets in any adjusted angular position. The bolt may in fact serve a fourth function, to-wit, that of passing through a support so that the pulley brackets may be secured or supported thereby.

In actual operation the conduit sections A may be of any length desired to carry and guide the chain or cable from one point to another. At the end of the conduit one of the pulley brackets is applied and adjusted for longitudinal length on the conduit and then for radial position by turning it about the longitudinal axis of the conduit. It is then secured either by set screws or lock nuts as previously stated. The second section of conduit, such as indicated at A', with a pulley bracket on the end thereof is then brought up to alignment with the first pulley bracket, the bolt 10 is inserted, the bushings applied and finally the nut. The second conduit, together with the pulley bracket applied thereto, is then swung about the bolt to assume the angular position required and the nut 11 is then tightened up to secure the pulley brackets and conduits in their adjusted position. If a support is required at this point, bolt 10 may be sufficiently long to extend through the support, for instance, a deck plate, a bulkhead, the flange of a beam, or whatever it may be, and the nut 11 is then applied on the inside surface of the support and drawn up tight. Again, if such a support is not convenient an ordinary strap hanger or pipe bracket, such as indicated at 16, may be employed. In other words, the conduit and the pulley brackets may either be secured by means of the bolts 10 or by the strap hangers, pipe clamps or the like at points desired. Any number of sections of conduit may be connected together and similarly any number of pulley brackets and a chain or cable may be thus directed to circumvent any obstruction and it will be noted that the chain or cable is properly guided no matter what direction is taken, whether it be an angle about a pulley or whether the pulley be adjusted to assume any radial angle about the longitudinal axis of the conduit, for instance, as indicated at 17 in Fig. 3. A device of this character may be readily and quickly installed, and it has another decided advantage, to-wit, that of reducing friction on the chain or cable to a minimum as it is perfectly guided and supported at all points.

Having thus described my invention I wish it understood that certain changes may be resorted to within the scope of the appended claims even though certain features have been more or less specifically illustrated and described. I also wish it understood that the material and finish of the various parts employed may be such as the experience and judgment of the manufacturer may dictate or various conditions may demand.

Having thus described my invention what I claim and desire to secure by Letters Patent is—

1. An adjustable cable conduit, comprising a plurality of conduits, means connecting the adjacent ends of the conduits, whereby the conduits may assume different angular positions with relation to each other, a cable of smaller diameter than the conduit extending through the conduits and their connections, and a supporting member in each conduit connection whereby the cable is maintained in alignment with the central longitudinal axis of the adjacent conduits.

2. In a cable conduit of the character described, a conduit section, a second conduit section, a pair of bracket members connecting the conduits at one end, a pivotal connection between the brackets permitting the brackets and the conduits to assume different angular positions with relation to each other, means whereby each bracket may be turned circumferentially on the conduits and secured, a third conduit, a pair of bracket members connecting the third conduit with the opposite end of the first named conduit, a pivotal connection between said brackets permitting the first conduit and the third conduit to assume different angular positions with relation to each other and permitting the third conduit to assume angular positions different to the second conduit, and means permitting circumferential adjustment of the last named bracket members with relation to the first and third conduit.

3. A device of the character described, comprising a pair of conduit members, brackets on the adjacent ends of the conduits, a pivot pin connecting the brackets, and a cable extending through the conduits and the brackets, said pivot pin being offset with relation to the conduits so that the peripheral surface of the pin aligns with the central longitudinal axis of the conduits and maintains the cable centrally thereof.

4. A device of the character described comprising a pair of conduit members, brackets on the adjacent ends of the conduits, a pivotal connection between the brackets, and a pulley journalled on the pivotal connection.

5. A device of the character described comprising a pair of conduit members, brackets on the adjacent ends of the conduits, a pivotal connection between the brackets, a pulley journalled on the pivotal connection, said brackets being off-set so that the peripheral edge of the pulley aligns with the central longitudinal axis of the conduits.

6. In a device of the character described comprising a pair of conduit members, an off-set bracket member carried by each conduit, means permitting rotation of each conduit within its bracket member, means for securing the conduits against rotation, a bolt passing through the bracket members, a sleeve on the bolt maintaining a predetermined spacing between the bracket members, means on the bolt for clamping the bracket members against the sleeve, a pulley journalled on the sleeve.

7. A device of the character described comprising a pair of conduit members, brackets on the adjacent ends of the conduits, a pivotal connection between the brackets permitting angular adjustment of the conduits with relation to each other, a cable of smaller diameter than the conduits extending therethrough, said pivotal connection forming a support for the cable and maintaining the cable in alignment with the central longitudinal axis of the adjacent conduits, and means whereby the conduits may be turned about their longitudinal axis in the brackets.

ROY H. MORRIS.